United States Patent [19]
Gramley

[11] 3,750,854
[45] Aug. 7, 1973

[54] BRAKE SHOE COOLING MEANS
[76] Inventor: Robert A. Gramley, R.D. No. 2, Franklin, Pa. 16323
[22] Filed: June 30, 1971
[21] Appl. No.: 158,423

[52] U.S. Cl...... 188/264 R, 188/250 A, 192/107 T, 192/113 A
[51] Int. Cl............................................ F16d 65/82
[58] Field of Search.................. 188/250 R, 250 A, 188/250 B, 250 E, 264 R, 245; 192/107 T, 113 R, 113 A

[56] References Cited
UNITED STATES PATENTS
1,923,872  8/1933  Loughead ................... 188/264 R X
2,909,244  10/1959  Kraft .......................... 188/264 R X FOREIGN PATENTS OR APPLICATIONS
768,743  2/1957  Great Britain ................. 188/264 R Primary Examiner—George E. A. Halvosa
Attorney—Charles L. Lovercheck

[57] ABSTRACT

A brake drum and cooling means combination is disclosed. The brake is made up of a shoe having spaced lining segments with the cooling members disposed between the lining segments. A slot extends in from each side of the shoe in the space between the lining segments and a cooling member is disposed in each slot. The cooling member has two fins on the side adjacent the lining members and two cooling fins on the side opposite the lining. The cooling fins are made of a high heat conductivity material such as aluminum.

5 Claims, 4 Drawing Figures

PATENTED AUG 7 1973

3,750,854

Inventor
ROBERT A. GRAMLEY

By
Charles L. Lauterbach
Attorney

BRAKE SHOE COOLING MEANS

OBJECTS OF THE INVENTION

It is an object of the invention to provide an improved brake cooling member.

Another object of the invention is to provide a combination brake cooling member and brake shoe.

Another object of the invention is to provide a means for cooling brakes that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figure 1:
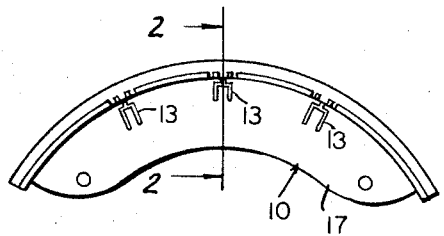
FIG. 1 is a side view of a brake according to the invention.
Figure 2:
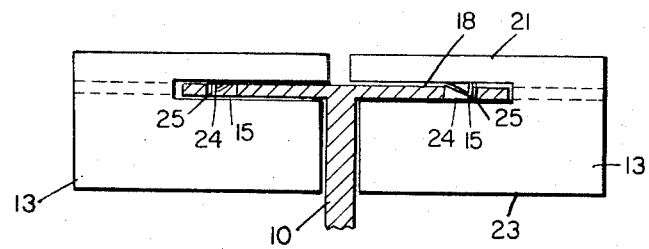
FIG. 2 is a cross sectional view taken on line 2—2 of FIG. 1.
Figure 3:
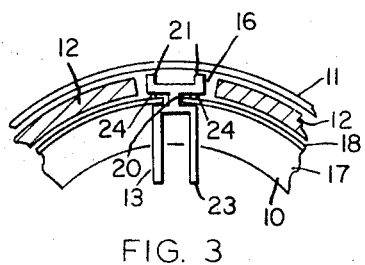
FIG. 3 is a side view of the brake shoe and brake drum with the heat transfer member in it.
Figure 4:
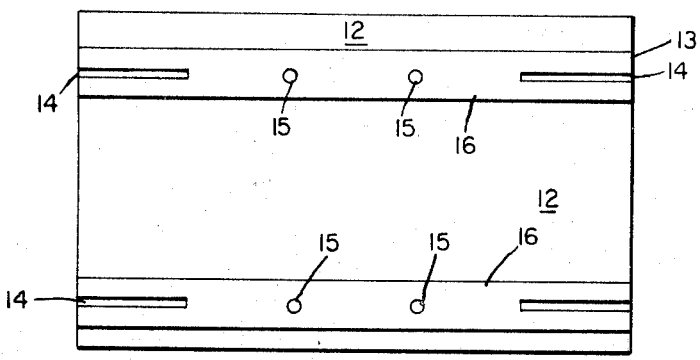
FIG. 4 is a top view of a brake shoe slotted to receive the heat transfer members according to the invention.

Now with more particular reference to the drawings, the brake shoe indicated at 10 has a web 17 and a shoe face 18. The shoe face has the lining segment 12 fixed to it by riveting, bonding, or other suitable attaching means. Space, indicated at 16, is thereby provided and the shoe face 18 is slotted at 14 in the area between the lining segment 12. These slots extend approximately one-fourth of the distance across the outer edge of the shoe face toward the center.

The cooling members 13 are supported on the brake shoes. The cooling members 13 have webs 20 that extend into the slots 14 and fins 21 are attached to the webs 20 and are disposed in the spaces between the lining members 12 on the side of the shoe adjacent the brake drum 11. The cooling members 13 could be held in place by lugs 24 attached to the underside of cooling members 13. The lugs may be struck down from the material of the members 13 in a manner familiar to those skilled in the art. The lugs have a beveled leading edge 25 which slides over the shoe and drops into the holes 15 locking the cooling members in place.

The long fins 23 are fixed to the web 20 on the side of the shoe opposite the drum 11. These long fins 23 aid in dissipating heat generated by friction between the drum 11 and the lining 12 when the brake is applied.

It will be seen that the cooling members may be made of aluminum or other material that has a high coefficient of thermal conductivity. The fins will assist in dissipating heat and thus avoiding undesirable effects in brakes, such as overheating of the brake drums, brake fade, and other undesirable results.

The foregoing specification sets forth the invention in its preferred practical forms but the structure shown is capable of modification within a range of equivalents without departing from the invention which is to be understood is broadly novel as is commensurate with the appended claims.

I claim:

1. In combination, a brake shoe, brake lining and cooling member, said brake shoe having circumferentially spaced lining members on a first side, laterally spaced slots in said shoe in the spaces between said lining segments, heat transfer members disposed in said slots, said heat transfer members having a portion disposed in a said space between said lining members on the side adjacent a brake drum, and second fins on the side of said heat transfer member on the side of said shoe remote from said brake drum, said heat transfer members being made of a material having a high coefficient of thermal conductivity, said brake is an external brake, said brake drum is disposed around said shoe and said heat transfer members have at least two said fins on the side of said shoe adjacent said drum.

2. The combination recited in claim 1 wherein said material is aluminum.

3. The combination recited in claim 1 wherein said heat transfer members have at least two fins on the side thereof remote from said drum.

4. The combination recited in claim 1 wherein at least one slot is adjacent each edge of said shoe, said slots extending toward each other a distance of approximately one-fourth the width of the brake shoe.

5. The combination recited in claim 4 wherein said heat transfer members are made up of a web which is disposed in each said slot, said fins are connected to said web on each side of said shoe.

* * * * *